United States Patent
Gwidt et al.

(10) Patent No.: US 8,332,127 B2
(45) Date of Patent: Dec. 11, 2012

(54) DUAL INJECTION FOR TORQUE REDUCTION

(75) Inventors: Jesse M. Gwidt, Brighton, MI (US); Matthew Pruski, Brighton, MA (US)

(73) Assignee: GM Global Technology Operations LLC

( * ) Notice: Subject to any disclaimer, the term of this patent is extended or adjusted under 35 U.S.C. 154(b) by 437 days.

(21) Appl. No.: 12/759,183

(22) Filed: Apr. 13, 2010

(65) Prior Publication Data

US 2011/0251772 A1  Oct. 13, 2011

(51) Int. Cl.
*B60T 7/12* (2006.01)
(52) U.S. Cl. .................. 701/105; 701/114; 123/406.11; 123/406.15; 123/406.47
(58) Field of Classification Search .......... 701/103–105, 701/114, 115; 123/294, 299, 300, 305, 406.11, 123/406.15, 406.23, 406.47
See application file for complete search history.

(56) References Cited

U.S. PATENT DOCUMENTS

| | | | |
|---|---|---|---|
| 6,772,585 B2 * | 8/2004 | Iihoshi et al. | 60/277 |
| 6,932,053 B2 * | 8/2005 | Ichihara et al. | 123/344 |
| 7,562,650 B2 * | 7/2009 | Tabata et al. | 123/491 |
| 7,698,048 B2 * | 4/2010 | Jung et al. | 701/103 |
| 7,747,379 B2 * | 6/2010 | Kita | 701/105 |
| 7,933,711 B1 * | 4/2011 | Ulrey et al. | 701/112 |
| 2003/0192305 A1 * | 10/2003 | Iihoshi et al. | 60/277 |
| 2009/0038583 A1 * | 2/2009 | Gwidt et al. | 123/299 |

\* cited by examiner

*Primary Examiner* — John Kwon

(57) ABSTRACT

A system comprises a torque control module, a combustion prediction module, and a fuel control module. The torque control module sets spark timing of an engine to produce a drive torque and determines an amount of delay to add to the spark timing to decrease the drive torque by a predetermined torque. The combustion prediction module predicts whether a single injection of fuel will combust in a cylinder of the engine when the amount of delay is added to the spark timing. The fuel control module actuates a plurality of separate injections of fuel into the cylinder when the combustion prediction module predicts that the single injection of fuel will not combust.

20 Claims, 5 Drawing Sheets

DUAL INJECTION FOR TORQUE REDUCTION

FIELD

The present disclosure relates to systems and methods for controlling engine torque, and more particularly to reducing engine torque using retarded spark timing.

BACKGROUND

An internal combustion engine combusts an air/fuel mixture within cylinders to produce drive torque. An engine control module controls the amount of fuel injected into the cylinders to control the air/fuel mixture, and in turn control the drive torque. Additionally, the engine control module may control spark timing to control the drive torque.

For example, the engine control module may retard spark timing in order to decrease drive torque. However, spark timing that is too far retarded may cause a misfire. Hydrocarbons released during a misfire may combust within a catalyst of an exhaust system, which may cause damage to the catalyst. Furthermore, the released hydrocarbons may increase a level of hydrocarbon emissions from the exhaust system.

SUMMARY

A system comprises a torque control module, a combustion prediction module, and a fuel control module. The torque control module sets spark timing of an engine to produce a drive torque and determines an amount of delay to add to the spark timing to decrease the drive torque by a predetermined torque. The combustion prediction module predicts whether a single injection of fuel will combust in a cylinder of the engine when the amount of delay is added to the spark timing. The fuel control module actuates a plurality of separate injections of fuel into the cylinder when the combustion prediction module predicts that the single injection of fuel will not combust.

A method comprises setting spark timing of an engine to produce a drive torque, determining an amount of delay to add to the spark timing to decrease the drive torque by a predetermined torque, predicting whether a single injection of fuel will combust in a cylinder of the engine when the amount of delay is added to the spark timing, and actuating a plurality of separate injections of fuel into the cylinder when the single injection of fuel will not combust.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1:
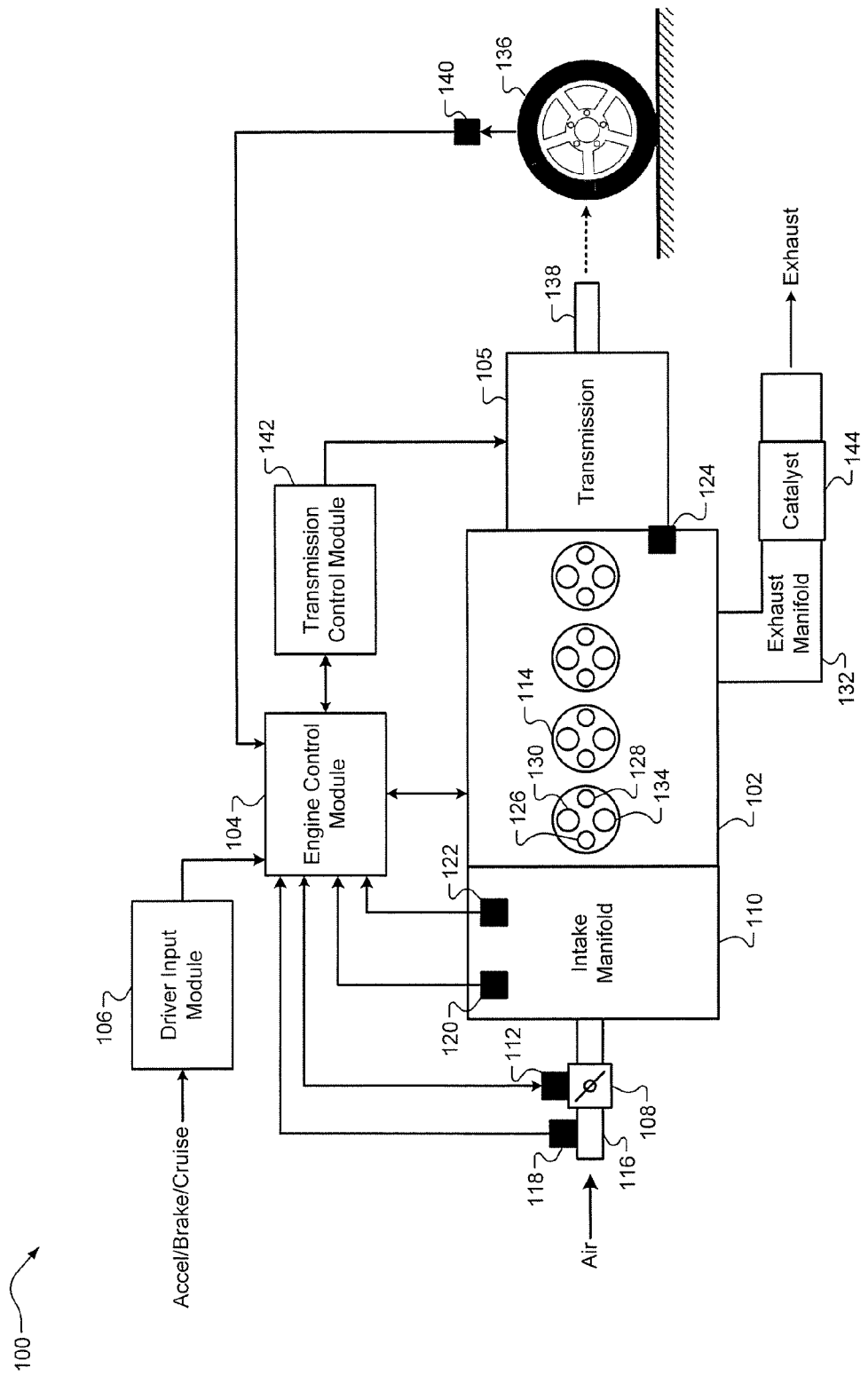
FIG. 1 is a functional block diagram of an exemplary vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Typically, an engine control module actuates a single injection of fuel into a cylinder of an engine during an intake stroke. The engine control module may delay (i.e., retard) spark timing used to combust the single injection in order to reduce drive torque produced by the engine. A misfire may occur when spark timing is retarded past a threshold timing when using the single injection. Accordingly, a reduction in drive torque achievable by using spark retard may be limited by the threshold timing when the engine control module actuates the single injection of fuel during the intake stroke.

Systems and methods of the present disclosure modify fuel injection in order to allow for further retarded spark timing and a greater achievable torque reduction. Specifically, systems and methods of the present disclosure implement two or more discrete injections of fuel during a combustion cycle. For example, a first portion of fuel may be injected during the intake stroke and a second portion of fuel may be injected during the compression stroke. The second portion of fuel may form a rich cloud near the spark plug that allows for combustion when using the spark timing that is retarded past the threshold timing. Accordingly, the systems and methods of the present disclosure allow for a greater drive torque reduction using spark timing than what is achievable when using a single injection of fuel during a combustion cycle.

An engine control module according to the present disclosure receives a drive torque reduction request and determines an amount of spark retard to add to achieve the drive torque reduction. The engine control module operates in one of two modes depending on whether the amount of spark retard will cause a misfire. In a single injection mode, the engine control module predicts whether the amount of spark retard will cause combustion of a single injection of fuel. For example, in the single injection mode, the engine control module predicts that the amount of spark retard will cause a misfire when the amount of spark retard delays the spark timing past the threshold timing. The engine control module transitions from the single injection mode to a dual injection mode when the amount of spark retard will cause a misfire in the single injection mode.

In the dual injection mode, the engine control module actuates two or more separate injections of fuel. For example, in the dual injection mode, the engine control module may actuate injection of one portion of fuel during the intake stroke and one portion of fuel during the compression stroke. The portion of fuel injected during the compression stroke may form a rich cloud near the spark plug that allows for combustion of both portions of fuel when the spark timing is retarded past the threshold timing. Accordingly, in the dual injection mode, the engine control module may further retard spark timing and achieve a further torque reduction as compared to the single injection mode.

Referring now to FIG. 1, an exemplary vehicle system 100 includes an engine 102 that combusts an air/fuel mixture to produce drive torque. The engine 102 drives a transmission 105 via a crankshaft (not shown). An engine control module (ECM) 104 communicates with components of the vehicle system 100. The components may include the engine 102, sensors, and actuators as discussed herein. The ECM 104 may implement the systems and methods of the present disclosure.

The engine 102 may produce drive torque for the vehicle system 100 based on driver input from a driver input module 106. Driver input may include, but is not limited to, a position of an accelerator/brake pedal or activation of a cruise control system. For example, the engine 102 may increase/decrease an amount of drive torque produced as a driver depresses/releases the accelerator pedal.

The ECM 104 actuates a throttle 108 to control an amount of airflow into an intake manifold 110. The ECM 104 may control the throttle 108 to control drive torque. A throttle position sensor 112 generates throttle position signals that indicate a position of the throttle 108. The ECM 104 determines the position of the throttle 108 based on the throttle position signals. Air within the intake manifold 110 is distributed into cylinders 114. While four cylinders 114 of the engine 102 are shown, the engine 102 may include more or less than four cylinders 114.

Air is passed from an inlet 116 through a mass airflow (MAF) sensor 118. The MAF sensor 118 generates a MAF signal that indicates a mass of air flowing into the intake manifold 110. A manifold pressure (MAP) sensor 120 is positioned in the intake manifold 110 between the throttle 108 and the engine 102. The MAP sensor 120 generates a MAP signal that indicates manifold absolute air pressure. An intake air temperature (IAT) sensor 122 located in the intake manifold 110 generates an IAT signal that indicates intake air temperature. The crankshaft rotates at engine speed or a rate that is proportional to the engine speed. A crankshaft sensor 124 generates a crankshaft position (CSP) signal that indicates the rotational speed and position of the crankshaft.

The ECM 104 receives the MAF, MAP, IAT, and CSP signals. The ECM 104 processes the signals and generates timed engine control commands that are output to the vehicle system 100. For example, engine control commands may actuate the throttle 108, fuel injectors 126, and spark plugs 128.

The ECM 104 actuates fuel injectors 126 to inject fuel into the cylinders 114 to achieve a desired air/fuel ratio. Fuel is injected directly into the cylinders 114. Accordingly, the engine 102 is a direct injection engine. The ECM 104 may control the amount of fuel injected into the cylinders 114 to control drive torque.

The ECM 104 actuates the spark plugs 128 to ignite the air/fuel mixture in the cylinders 114. The timing of the spark may be specified relative to a time when a piston (not shown) is at its topmost position, referred to as top dead center (TDC). The timing of the spark may be specified according to how far before or after TDC the spark is generated. Combustion of the air/fuel mixture during a combustion stroke drives the piston down, thereby driving the crankshaft. The combustion stroke may be defined as the time between the piston reaching TDC and the time at which the piston returns to bottom dead center (BDC).

The ECM 104 may control the timing of the spark to control drive torque. Accordingly, the ECM 104 may adjust the timing of the spark in order to produce a desired drive torque. For example, the ECM 104 may retard spark timing to reduce drive torque.

Generating the spark may be referred to as a firing event. The ECM 104 may have the ability to vary the timing of the spark for each firing event. Accordingly, the ECM 104 may control (e.g., increase, decrease, maintain) drive torque at each firing event.

An intake camshaft (not shown) regulates a position of an intake valve 130 to enable air to enter the cylinder 114. Combustion exhaust within the cylinder 114 is forced out through an exhaust manifold 132 when an exhaust valve 134 is in an open position. An exhaust camshaft (not shown) regulates a position of the exhaust valve 134. Although single intake and exhaust valves 130, 134 are illustrated, the engine 102 may include multiple intake and exhaust valves 130, 134 per cylinder 114. In some implementations, the ECM 104 may control intake and exhaust cam phaser angles to control drive torque.

Drive torque produced by the engine 102 drives wheels 136 via an output shaft 138. The vehicle system 100 may include one or more wheel speed sensors 140 that generate wheel speed signals. The ECM 104 determines the rotational speed of the wheels 136 based on the wheel speed signals. The ECM 104 may determine whether one or more of the wheels 136 are slipping based on the wheel speed signals. The ECM 104 may control drive torque when wheel slip is detected in order to compensate for the wheel slip.

The ECM 104 communicates with a transmission control module 142 to coordinate shifting gears in the transmission 105. The transmission control module 142 may request a torque reduction to accommodate for gear shifts. Accordingly, the ECM 104 may reduce drive torque in response to the torque reduction request from the transmission control module 142. In some implementations, torque reduction requests from the transmission control module 142 results from clutch fuel cutoff, which reduces drive torque when the driver depresses a clutch pedal in a manual transmission vehicle to prevent a flare (rapid rise) in engine speed.

The ECM 104 may retard spark timing while maintaining an amount of fuel and air provided to the cylinders 114 to reduce drive torque. However, spark timing that is too retarded may cause a misfire. In other words, a spark timing that is too retarded may result in the air/fuel mixture being expelled from the cylinders 114. Expelled fuel may combust in a catalyst 144 of the exhaust manifold 132 and damage the catalyst 144.

Figure 2:
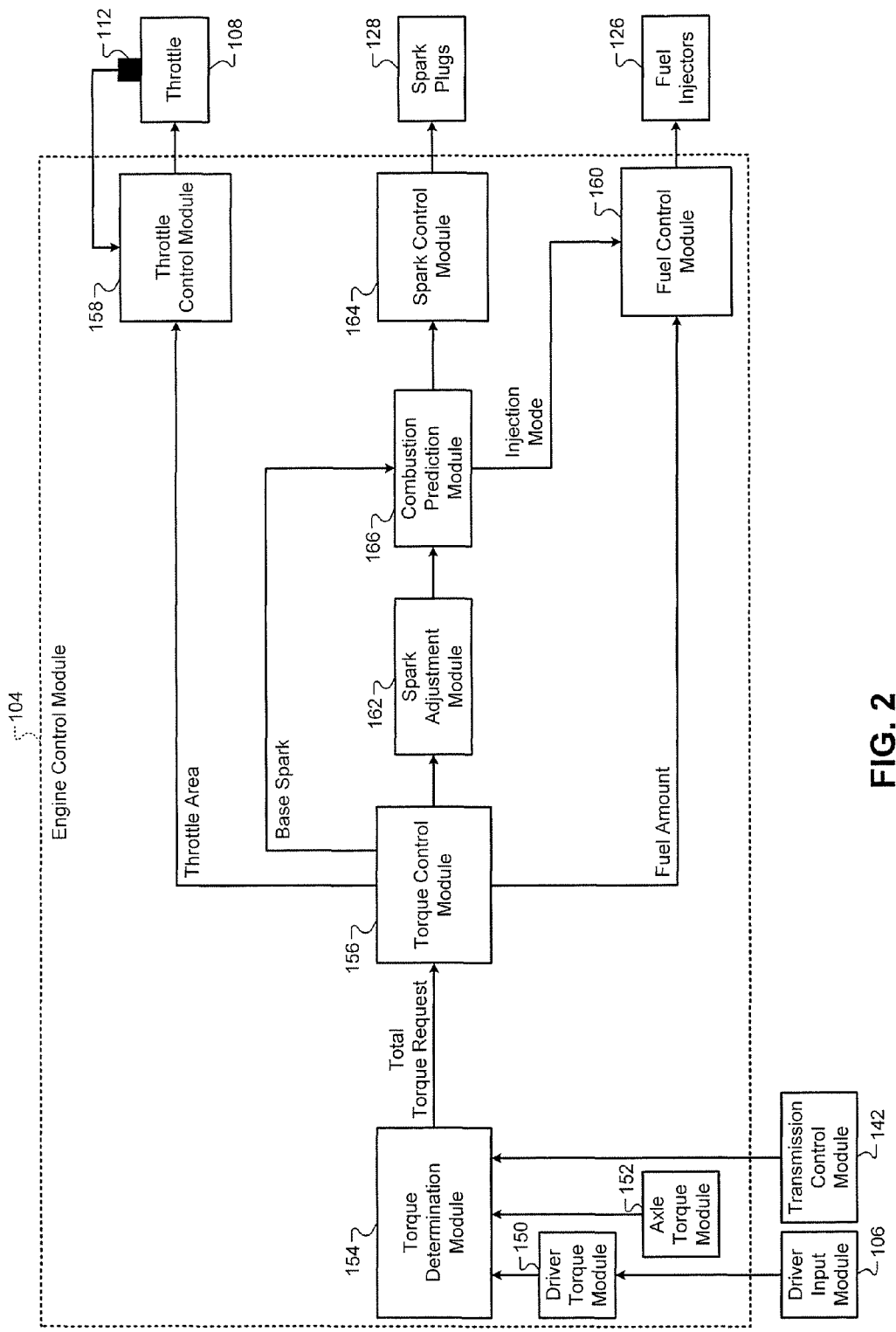
FIG. 2 is a functional block diagram of an engine control module according to the present disclosure.

Referring now to FIG. 2, a functional block diagram of the ECM 104 is shown. The ECM 104 includes a driver torque module 150. The driver torque module 150 determines a driver torque request based on a driver input from the driver input module 106. The driver input may be based on a position of an accelerator/brake pedal. The driver input may also be based on activation of a cruise control system, which may be an adaptive cruise control system that varies vehicle speed to maintain a predetermined following distance. The driver torque module 150 may store one or more mappings of accelerator pedal position to desired torque, and may determine the driver torque request based on a selected one of the mappings.

An axle torque module 152 determines axle torque requests. Axle torque requests may include a torque reduction requested by a traction control system (not shown) when positive wheel slip is detected. Positive wheel slip occurs when axle torque overcomes friction between the wheels 136 and the road surface, and the wheels 136 begin to slip against the road surface. Axle torque requests may also include a torque increase request to counteract negative wheel slip, where a wheel 136 slips in the other direction with respect to the road surface because the axle torque is negative.

Axle torque requests may also include brake management requests and vehicle over-speed torque requests. Brake management requests may reduce drive torque to ensure that the drive torque does not exceed the ability of the brakes to hold the vehicle when the vehicle is stopped. Vehicle over-speed torque requests may reduce drive torque to prevent the vehicle from exceeding a predetermined speed. Axle torque requests may also be generated by vehicle stability control systems.

A torque determination module 154 receives the driver torque requests, the axle torque requests, and torque reduction requests from the transmission control module 142. The torque determination module 154 determines a total torque request based on the driver torque request, the axle torque requests, and the torque reduction request from the transmission control module 142. The total torque request may vary depending on whether the driver torque request increases/decreases, whether the axle torque requests increase/decrease, and whether the transmission control module 142 requests a torque reduction for a gear shift. For example, when the driver torque request and the axle torque requests are constant and the transmission control module 142 requests a torque reduction for a gear shift, the total torque request is reduced by an amount equal to the torque reduction for the gear shift.

A torque control module 156 determines how the total torque request will be achieved. For example, the torque control module 156 may achieve the total torque request using at least one of the throttle 108, the spark plugs 128, and the fuel injectors 126. The torque control module 156 may generate a throttle area value to control drive torque using the throttle 108. The torque control module 156 may generate a fuel amount value to control drive torque using the fuel injectors 126. The torque control module 156 generates a base spark value to control drive torque using the spark plugs 128.

A throttle control module 158 controls the position of the throttle 108 based on the throttle area value. A fuel control module 160 actuates the fuel injectors 126 to inject the fuel amount into each of the cylinders 114. A spark control module 164 actuates the spark plugs 128 to ignite the air/fuel mixture based on the base spark value. Specifically, the spark control module 164 controls the spark plugs 128 using the base spark value and a spark adjustment value described hereinafter. During normal operation of the engine 102, the fuel control module 160 may control the fuel injectors 126 and the throttle control module 158 may control the throttle 108 to maintain a stoichiometric air/fuel ratio. The torque control module 156 may therefore determine a fuel amount value and throttle area value that will yield stoichiometric combustion during normal operation of the engine 102.

The torque control module 156 determines that the total torque request is reduced when at least one of the driver torque request, axle torque requests, and the transmission torque request is reduced. A reduction in the total torque request may be referred to hereinafter as a "total torque reduction." For example, when the driver torque request and the axle torque requests are maintained and the transmission control module 142 requests a torque reduction for a gear shift, the total torque reduction is equal to the torque reduction requested by the transmission control module 142.

A spark adjustment module 162 determines a spark adjustment value that will achieve the total torque reduction. The spark adjustment value may be an amount of delay (i.e., spark retard) used to achieve the total torque reduction. In other words, the spark adjustment module 162 determines the amount of spark retard to add to the base spark value in order to achieve the total torque reduction. A combustion prediction module 166 determines a spark timing, based on the spark adjustment value and the base spark value, that is used by the spark control module 164 to achieve the total torque reduction. Accordingly, the total torque reduction may be achieved by retarding the spark timing from the base spark value by an amount equal to the spark adjustment value. When no torque reduction is requested, the spark adjustment value may be zero, and the spark control module 164 may maintain the spark timing at the base spark value.

The spark adjustment module 162 may determine the amount of spark retard to add to the base spark value based on a table and/or function that relates drive torque to spark timing. For example, the table and/or function may determine an amount of spark retard used to achieve the total torque reduction based on engine operating parameters including, but not limited to, air-per-cylinder, cam phaser position, and air/fuel ratio.

After receiving a new spark timing value (i.e., a different base spark value and/or a different spark adjustment value), the spark control module 164 may be able to change spark timing for the following firing event. Therefore, the spark control module 164 may be able to vary drive torque during each firing event.

A spark timing that is too far retarded may cause a misfire. A misfire may result in no torque production during a firing event. In other words, a misfire may result in a torque reduction that is greater than the total torque reduction. Systems and methods of the present disclosure modify fuel injection in order to allow for a more retarded spark timing and a greater reduction in drive torque during a firing event without causing a misfire. More specifically, the systems and methods of the present disclosure transition from a single injection mode to a dual injection mode when the amount of spark retard causes a misfire in the single injection mode. The spark timing may be further retarded in the dual injection mode without resulting in a misfire, allowing for a greater torque reduction through the use of retarded spark timing.

Typically, the ECM 104 operates in the single injection mode. In the single injection mode, the fuel control module 160 actuates the fuel injectors 126 to inject a single pulse of fuel in a cylinder 114 per combustion cycle. For example, the single pulse of fuel may be injected during an intake stroke. The spark control module 164 may retard spark timing in the single injection mode in order to reduce drive torque. However, a spark timing that is too far retarded (e.g., greater than 5° after TDC) may result in a misfire in the single injection mode.

The ECM 104 transitions from the single injection mode to the dual injection mode to prevent misfires caused by retarded spark timing. Specifically, the ECM 104 transitions from the single injection mode to the dual injection mode when the amount of spark retard causes the spark timing to be greater than a predetermined threshold (e.g., 5° after TDC) that causes a misfire. The fuel control module 160 injects the fuel amount in two separate pulses when the ECM 104 operates in the dual injection mode. For example, the fuel control module 160 may actuate injection of a first portion of the fuel amount during the intake stroke, and actuate an injection of a second portion of the fuel amount during the compression stroke. The spark timing may be retarded further in the dual injection mode than the single injection mode without resulting in a misfire.

Figure 3B:
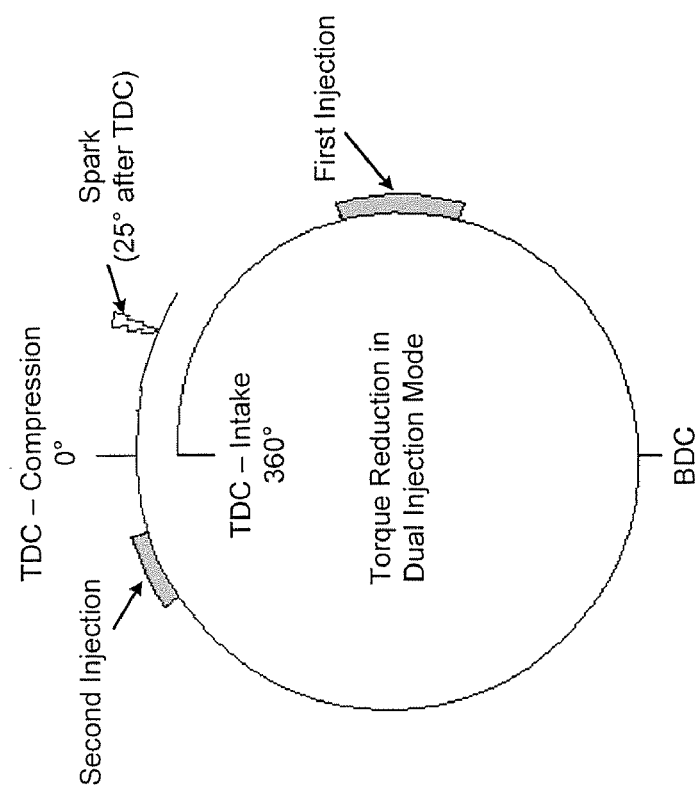
FIG. 3B illustrates a first injection, a second injection, and spark timing for the engine operating in a dual injection mode.
Figure 3A:
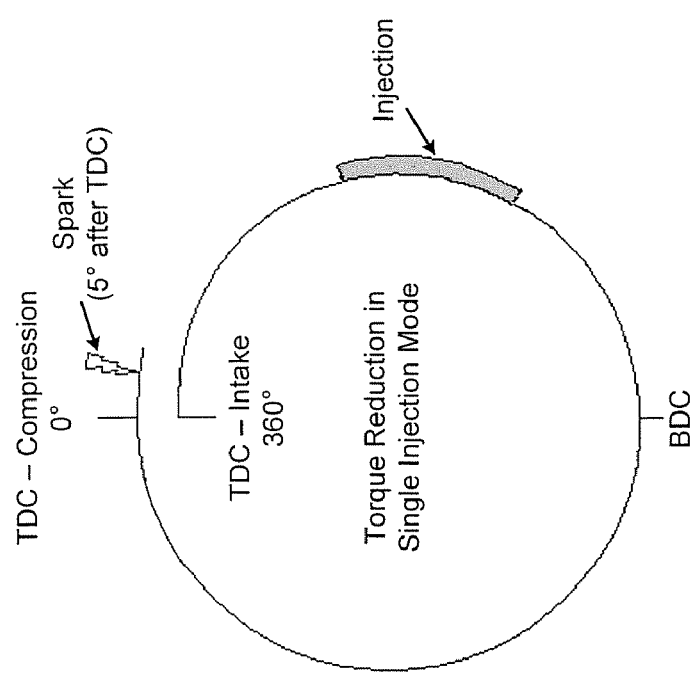
FIG. 3A illustrates injection and spark timing for an engine operating in a single injection mode.

Exemplary injection and spark timing for the single and dual injection modes is shown in FIGS. 3A and 3B, respectively. In the single injection mode, fuel is typically injected during the intake stroke (e.g., the first half of the intake stroke). The air/fuel mixture may be sparked during the second half of the compression stroke (e.g., up to 50° before TDC) during normal operation. Spark timing may be retarded in order to reduce drive torque. For example, in FIG. 3A, spark timing is retarded until 5° after TDC to reduce drive torque.

In some implementations, a spark timing of 5° after TDC may cause a misfire in the single injection mode. When further torque reduction is desired, spark timing may be further retarded using dual injection as shown in FIG. 3B. For example, spark timing may be further retarded in the dual injection mode by as much as 10-30° more than in the single injection mode. In FIG. 3B, a first portion of fuel is injected in the intake stroke, a second portion of fuel is injected near TDC, and spark timing is retarded to 25° after TDC. While FIG. 3B illustrates the first portion of fuel injected in the intake stroke and the second portion of fuel injected near TDC, other injection times are contemplated.

The fuel control module 160 may control injection of the same amount of fuel per combustion cycle in dual injection mode as in single injection mode. Accordingly, the fuel control module 160 may split the fuel amount value between the first and second injections in the dual injection mode. For example, the fuel control module 160 may split the fuel amount to 70% in the first injection and 30% in the second injection.

A misfire while using retarded injection timing in the single injection mode may be caused because the air/fuel mixture may not be sufficiently combustible (i.e., rich) near the spark plug 128 after a sufficient number of degrees after TDC. The second injection during the dual injection mode may form a rich cloud of fuel near the spark plug 128 that may be ignited even using a retarded spark timing that would cause a misfire in the single injection mode. The rich cloud ignited in the dual injection mode further ignites fuel from the first injection. Accordingly, spark timing may be retarded further in dual injection mode than in single injection mode, allowing for a greater reduction in torque in the dual injection mode using a retarded spark timing.

Referring back to FIG. 2, a combustion prediction module 166 determines the injection mode of the ECM 104 based on the spark adjustment value and the current injection mode. The fuel control module 160 injects fuel based on the injection mode determined by the combustion prediction module 166.

The combustion prediction module 166 includes a single injection threshold (e.g., 5° after TDC) and a dual injection threshold (e.g., 15°-35° after TDC). The single injection threshold is a spark timing threshold that indicates a maximum spark retard in the single injection mode. For example, a misfire may occur when the spark timing (i.e., the base spark value plus the spark adjustment value) is greater than the single injection threshold in the single injection mode. The dual injection threshold is a spark timing threshold that indicates a maximum spark retard in the dual injection mode. For example, a misfire may occur when the spark timing is greater than the dual injection threshold in the dual injection mode.

The combustion prediction module 166 compares the spark timing to the single injection threshold when the ECM 104 operates in the single injection mode. The combustion prediction module 166 instructs the fuel control module 160 to actuate fuel injection in the single injection mode when the spark timing is less than the single injection threshold. The combustion prediction module 166 instructs the fuel control module 160 to actuate fuel injection in the dual injection mode when the spark timing is greater than the single injection threshold.

The combustion prediction module 166 compares the spark timing to the dual injection threshold when the ECM 104 operates in the dual injection mode. The combustion prediction module 166 instructs the spark control module 164 to limit the spark retard to the dual injection threshold when the spark timing is greater than the dual injection threshold. Accordingly, the spark control module 164 limits the spark retard to the dual injection threshold to prevent misfire during dual injection mode.

Figure 4:
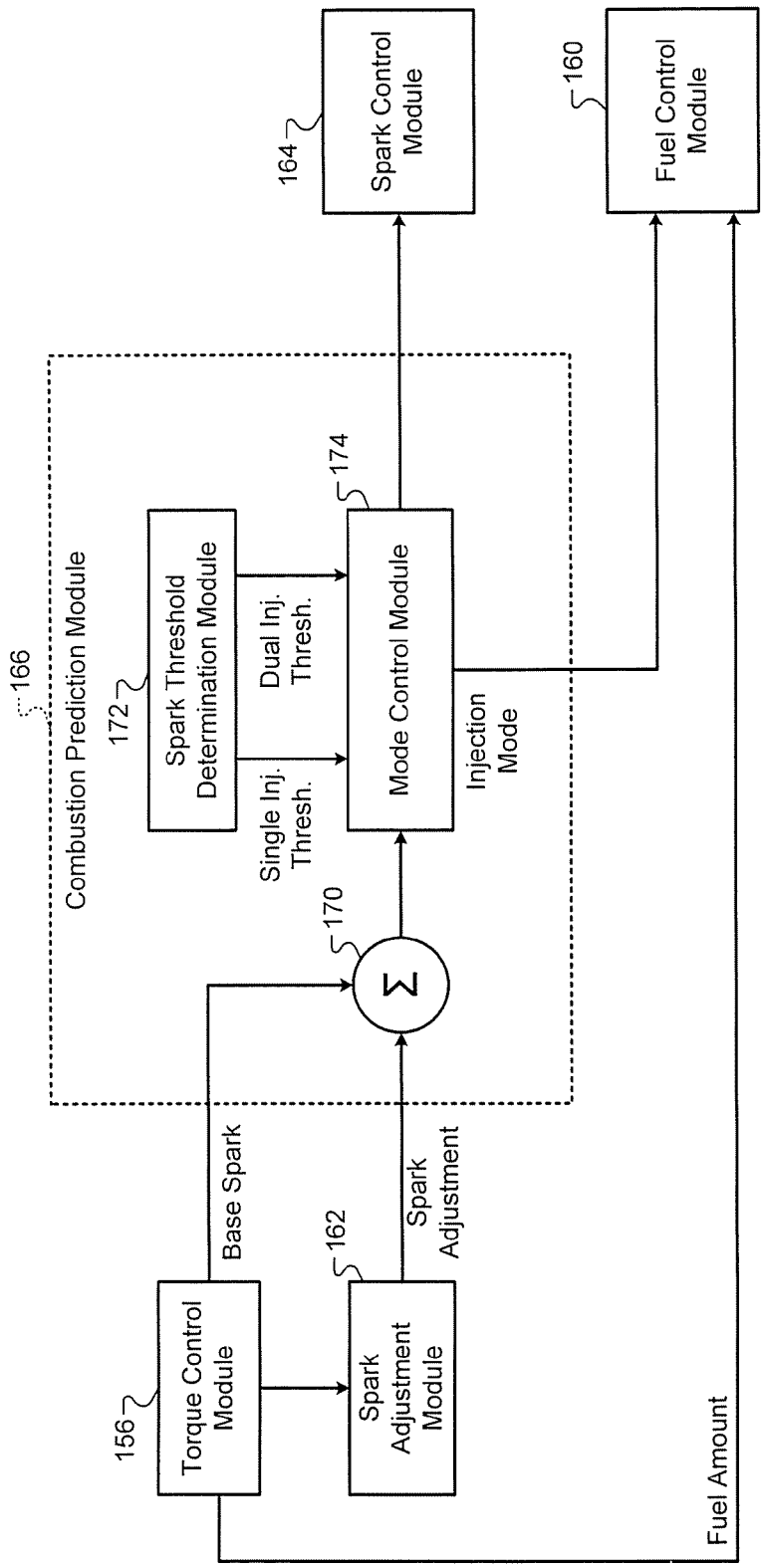
FIG. 4 is a functional block diagram of an exemplary combustion prediction module.

Referring now to FIG. 4, an exemplary combustion prediction module 166 is shown. The combustion prediction module 166 includes a summation module 170, a spark threshold determination module 172, and a mode control module 174. The summation module 170 adds the base spark value to the spark adjustment value. The spark threshold determination module 172 determines the single and dual injection thresholds. The mode control module 174 compares the sum of the base spark value and the spark adjustment value to the single injection threshold when the ECM 104 operates in the single injection mode. The mode control module 174 instructs the fuel control module 160 to actuate fuel injection in the single injection mode when the sum of the base spark value and the spark adjustment value is less than the single injection threshold. Additionally, the mode control module 174 instructs the spark control module 164 to set the spark timing to the sum of the base spark value and the spark adjustment value. The mode control module 174 instructs the fuel control module 160 to actuate fuel injection in the dual injection mode when the sum is greater than the single injection threshold.

The mode control module 174 compares the sum of the base spark value and the spark adjustment value to the dual injection threshold when the ECM 104 operates in the dual injection mode. The mode control module 174 instructs the spark control module 164 to set the spark timing to the sum of the base spark value and the spark adjustment value when the sum is less than the dual injection threshold. The mode control module 174 instructs the spark control module 164 to limit the spark retard to the dual injection threshold when the sum is greater than the dual injection threshold. Accordingly, the spark control module 164 limits the spark retard to the dual injection threshold to prevent misfire during dual injection mode.

Figure 5:
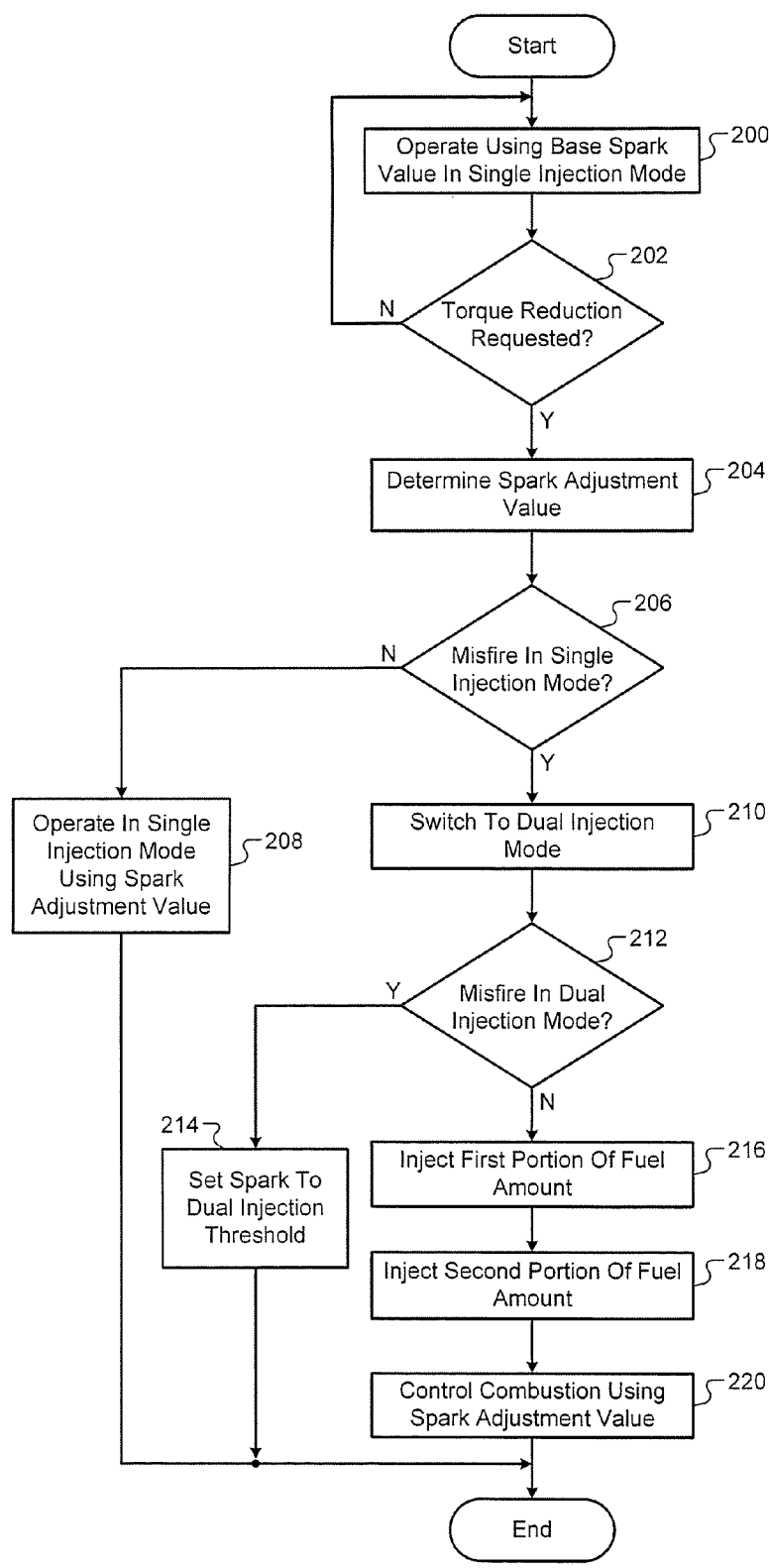
FIG. 5 illustrates a method for reducing drive torque using retarded spark timing and dual fuel injection.

Referring now to FIG. 5, a method for reducing drive torque using retarded spark timing and dual fuel injection starts at 200. At 200, the ECM 104 operates in the single injection mode using the base spark value. At 202, the torque control module 156 determines whether a reduction in drive torque is requested. If false, the method repeats 200. If true, the method continues at 204. At 204, the spark adjustment module 162 determines the spark adjustment value to achieve the total torque reduction. At 206, the combustion prediction module 166 determines whether the sum of the base spark value and spark adjustment value is greater than the single injection threshold. In other words, at 206, the combustion prediction module 166 predicts whether a misfire will occur in the single injection mode. If false, the method continues at 208. If true, the method continues at 210. At 208, the ECM 104 remains in the single injection mode and the spark control module 164 controls spark timing using the spark adjustment value. At 210, the combustion prediction module 166 transitions the ECM 104 from the single injection mode to the dual injection mode.

At 212, the combustion prediction module 166 determines whether the sum of the base spark value and the spark adjustment value is greater than the dual injection threshold. In other words, at 212, the combustion prediction module 166 predicts whether a misfire will occur in the dual injection mode. If true, the method continues at 214. If false, the method continues at 216. At 214, the combustion prediction module 166 instructs the spark control module 164 to limit the spark retard to the dual injection threshold so that a misfire does not occur in dual injection mode. At 216, the fuel control module 160 actuates injection of a first portion of the fuel amount (e.g., during the intake stroke). At 218, the fuel control module 160 actuates injection of a second portion of the fuel amount (e.g., during the compression stroke). At 220, the spark control module 164 controls ignition of the first and second amounts of fuel using the base spark value retarded by the spark adjustment value.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a torque control module that sets spark timing of an engine to produce a drive torque and that determines an amount of delay to add to the spark timing to decrease the drive torque by a predetermined torque;
    a combustion prediction module that predicts whether a single injection of fuel will combust in a cylinder of the engine when the amount of delay is added to the spark timing; and
    a fuel control module that actuates a plurality of separate injections of fuel into the cylinder when the combustion prediction module predicts that the single injection of fuel will not combust.

2. The system of claim 1, wherein the torque control module determines the amount of delay based on one of a function and a table that relates drive torque to spark timing.

3. The system of claim 2, wherein the torque control module determines the amount of delay based on one of an air-per-cylinder value and an air-fuel ratio.

4. The system of claim 1, wherein the predetermined torque corresponds to a torque reduction request that is generated based on one of a gear shift, a traction control system, a brake management request, and driver input.

5. The system of claim 1, wherein the combustion prediction module predicts that the single injection of fuel will combust when the sum of the spark timing and the amount of delay is less than a predetermined spark timing threshold.

6. The system of claim 5, wherein the combustion prediction module predicts that the single injection of fuel will not combust when the sum of the spark timing and the amount of delay is greater than the predetermined spark timing threshold.

7. The system of claim 1, wherein the fuel control module actuates a first injection of the plurality of separate injections during an intake stroke, and wherein the fuel control module actuates a second injection of the plurality of separate injections during a compression stroke.

8. The system of claim 7, wherein the first injection includes a greater amount of fuel than the second injection.

9. The system of claim 1, wherein the amount of fuel injected in the single injection is equal to the amount of fuel injected in the plurality of separate injections.

10. The system of claim 1, wherein the combustion prediction module predicts whether the plurality of separate injections of fuel will combust in the cylinder of the engine when the amount of delay is added to the spark timing, and wherein the torque control module sets the spark timing of the engine to a predetermined value when the combustion prediction module predicts that the plurality of separate injections will not combust.

11. A method comprising:
    setting spark timing of an engine to produce a drive torque;
    determining an amount of delay to add to the spark timing to decrease the drive torque by a predetermined torque;
    predicting whether a single injection of fuel will combust in a cylinder of the engine when the amount of delay is added to the spark timing; and
    actuating a plurality of separate injections of fuel into the cylinder when the single injection of fuel will not combust.

12. The method of claim 11 further comprising determining the amount of delay based on one of a function and a table that relates drive torque to spark timing.

13. The method of claim 12 further comprising determining the amount of delay based on one of an air-per-cylinder value and an air-fuel ratio.

14. The method of claim 11 wherein the predetermined torque corresponds to a torque reduction request that is generated based on one of a gear shift, a traction control system, a brake management request, and driver input.

15. The method of claim 11 further comprising predicting that the single injection of fuel will combust when the sum of the spark timing and the amount of delay is less than a predetermined spark timing threshold.

16. The method of claim 15 further comprising predicting that the single injection of fuel will not combust when the sum of the spark timing and the amount of delay is greater than the predetermined spark timing threshold.

17. The method of claim 11 further comprising:
    actuating a first injection of the plurality of separate injections during an intake stroke; and
    actuating a second injection of the plurality of separate injections during a compression stroke.

18. The method of claim 17, wherein the first injection includes a greater amount of fuel than the second injection.

19. The method of claim 11, wherein the amount of fuel injected in the single injection is equal to the amount of fuel injected in the plurality of separate injections.

20. The method of claim 11 further comprising:
    predicting whether the plurality of separate injections of fuel will combust in the cylinder of the engine when the amount of delay is added to the spark timing; and
    setting the spark timing of the engine to a predetermined value when the plurality of separate injections will not combust.

* * * * *